United States Patent [19]
Chisholm et al.

[11] Patent Number: 5,802,546
[45] Date of Patent: *Sep. 1, 1998

[54] STATUS HANDLING FOR TRANSFER OF DATA BLOCKS BETWEEN A LOCAL SIDE AND A HOST SIDE

[75] Inventors: Douglas Roderick Chisholm, Delray Beach; Gary Hoch, Coral Springs, both of Fla.; Timothy Vincent Lee, Raleigh; Andrew Boyce McNeill, Jr., Apex, both of N.C.; Ed Wachtel, New York, N.Y.

[73] Assignee: International Business Machines Corp., Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 573,221

[22] Filed: Dec. 13, 1995

[51] Int. Cl.$^6$ .................................................. G06F 12/00
[52] U.S. Cl. ........................... 711/100; 711/111; 711/156; 711/161
[58] Field of Search ..................... 395/825, 309, 395/200.01, 468, 478, 842; 711/100, 141, 151

[56] References Cited

U.S. PATENT DOCUMENTS

| | | | |
|---|---|---|---|
| 4,212,057 | 7/1980 | Devlin et al. | 395/478 |
| 5,131,082 | 7/1992 | Bonevento et al. | 395/825 |
| 5,155,807 | 10/1992 | Blevins et al. | 395/200.01 |
| 5,249,284 | 9/1993 | Kass et al. | 395/468 |
| 5,325,492 | 6/1994 | Bonevento et al. | 395/309 |
| 5,594,923 | 1/1997 | Inoue et al. | 395/842 |

*Primary Examiner*—Tod R. Swann
*Assistant Examiner*—Fred F. Tzeng
*Attorney, Agent, or Firm*—George E. Grosser

[57] ABSTRACT

An information handling system transfers data blocks between a host processing side having a host processing unit and a host memory and a local processing side having a local processing unit and a local memory. The host memory includes a status queue memory portion having a plurality of status queue images each image storing a status information relating to a corresponding data transfer. The status information relating to data block transfers are posted on the host processing side. The host processing unit, upon system initialization, sets up a status queue register set within the local processing side defining status queue parameters including the location of the status queue memory portion within the host memory and pointer values pointing to where status queue images are to be stored and from where they are to be retrieved.

14 Claims, 7 Drawing Sheets

STATUS HANDLING FOR TRANSFER OF DATA BLOCKS BETWEEN A LOCAL SIDE AND A HOST SIDE

RELATED ART

U.S. patent application Ser. Nos. 08/572,264 filed Dec. 13, 1995 and 08/572,265 filed Dec. 13, 1995.

TECHNICAL FIELD

This invention relates to the field of computer systems and more particularly to handling of status information relating to transfer of data blocks between two processing units.

BACKGROUND

With the widespread acceptance of personal computers in today's society, there is a constant need to reliably transfer large blocks of data among various component of the system. Networked personal computers (PC) have a constant need to receive and transmit large blocks of data among each other. Furthermore, the need for transferring large blocks of data is specially important in the increasingly popular client/ server information handling environments. In such environments, a plurality of client work stations are networked and coupled to one or more server system, thus, allowing the client stations to share system resources, such as, files, printers, and applications. As a result, server systems are often required to transfer very large blocks of data from storage devices to client stations. In order to insure data integrity, it is customary to generate a status signal upon completion of data block transfers indicating transfer error conditions, if any.

Generally, data transfer from one system to another is handled through a local interface controller which is coupled to a host system unit via an Input/output (I/O) expansion bus. The interface controller may be a storage device interface, such as a Small Computer System Interface (SCSI) controller, or a communication interface such as an Ethernet or Token Ring Local Area Network Controller (LAN). Some I/O expansion bus protocols allow an interface controller to take control of the bus and transfer data to and from the host unit. Such interface controllers are known as bus masters and operate with I/O buses supporting bus mastering protocols. Two exemplary I/O expansion buses supporting bus mastering protocols are Peripheral Component Interconnect (PCI) bus and MicroChannel I/O bus.

Over the years various techniques have been devised for transferring data to and from a memory device efficiently. Direct memory access (DMA) technique has been widely used to transfer large blocks of consecutive data from a direct access storage device (DASD) to and from system memory. In a computer system with DMA capability, CPU is relieved of the overhead involved in transferring large amounts of data by transmitting only a starting address, and block count to a DMA controller. The system CPU simply programs the DMA controller with the starting address and the byte count to perform the specified DMA transfer. The DMA controller which may be implemented as a state machine receives and stores within its internal registers the starting address information and the block count transmitted by the CPU. Thereafter, depending on data direction signaled by the CPU, the DMA controller sequentially transfers the data between the system memory and a local interface controller over the I/O expansion bus. Upon completion of each data transfer, the DMA controller generates a signal informing the CPU of completion of the data transfer as well as a status signal indicating whether any transfer error conditions occurred during the DMA transfer. Depending on a transfer error condition and controlling software, the CPU may retry the DMA cycle.

It is well known that some operating systems (OS) controlling a computer system usually allocate system memory in a manner that may result in creation of non-contiguous memory portions. Therefore, non-allocated memory portions of various sizes may be produced among the allocated memory portions. However, it is often the case that a contiguous data block directed to system memory may not fit into one or more of the non-allocated portions. Consequently, the operating system is forced to allocate contiguous memory areas to accommodate such large data block. As such, portions of the system memory may remain unallocated resulting in inefficient use of the system memory.

In order to overcome this problem, computer systems have utilized a data transfer technique known as scatter/ gather operation where contiguous data blocks are subdivided to fit (i.e. scattered) the non-contiguous memory portions. During a system read operation, a contiguous data block is scattered into the non-contiguous portions of the system memory. Conversely, during a write operation, the scattered data blocks are gathered from the non-contiguous memory portions and are arranged to create a contiguous data block. A scatter/gather list (SGL) is stored in the system memory to keep track of the scattered memory portions. The SGL includes the starting address and byte count of the divided memory portions and their byte thus keeping track of where data blocks should be scattered or where they should be gathered from. In systems having scatter/gather capability DMA like state machines receive starting address and byte count information as indicated by the SGL for each data block and perform the corresponding data transfer. Upon completion of each data block involved in the scatter/ gather operation, the CPU is informed of completion of a data block transfer or status of error transfer conditions, if any.

However, interrupting the CPU after completion of a data block transfer may hinder CPU performance, since the CPU is forced to stop performing a current task to service the interrupts generated after completion of a data block transfer. This problem becomes specially acute when transferring a large block of data in a system which utilizes scatter/gather operation having many interrupts associated with scattered data blocks. Therefore, current systems utilize one of many interrupt masking techniques to reduce CPU overhead involved with servicing data transfer interrupts. Furthermore, some systems utilize data transfer queuing mechanisms to queue data transfer status information of data blocks thus allowing the CPU to appropriately time the servicing of data block transfers. One such method titled "SYSTEM FOR ASYNCHRONOUSLY DELIVERING SELF-DESCRIBING CONTROL ELEMENTS WITH A PIPE INTERFACE HAVING DISTRIBUTED SHARED MEMORY" is disclosed in the U.S. Pat. No. 5, 325,492, issued on Jun. 28, 1994 and assigned to the assignee of the present invention.

However, with the advent of local interface controllers capable of performing local mastering there is also a need to reduce data transfer status overhead on the local processing side in order to increase data transfer throughput between host and local processing sides.

SUMMARY OF THE INVENTION

According to the present invention, an information handling system capable of handling data block transfers between a host processing side and a local processing side includes a host processing unit and a host memory accessible by the host processing unit in the host processing side and a local processing unit and a local memory in the local processing side. Before start of any data block transfer, the host processing unit stores a set of predefined information in a status queue register set defining a status queue memory portion. The status queue memory portion, which is preferably located at an address within the host memory, includes a plurality of status queue images. Each status queue image stores status information relating to a corresponding data block transfer. The host processing unit upon initialization sets appropriate pointer values pointing to addresses within the status queue memory portion indicating where a subsequent status queue image is to be stored and from where a subsequent status image is to be retrieved. Preferably, the status register set is located within the local processing side. A status transfer controller is responsive to the status queue register set for transferring status queue images to the status queue portion without local processing unit intervention. Thus, the local processing unit is relieved of overhead involved with transmitting status information after completion of each data block.

DETAILED DESCRIPTION OF THE PREFERRED EMBODIMENT

Figure 1:
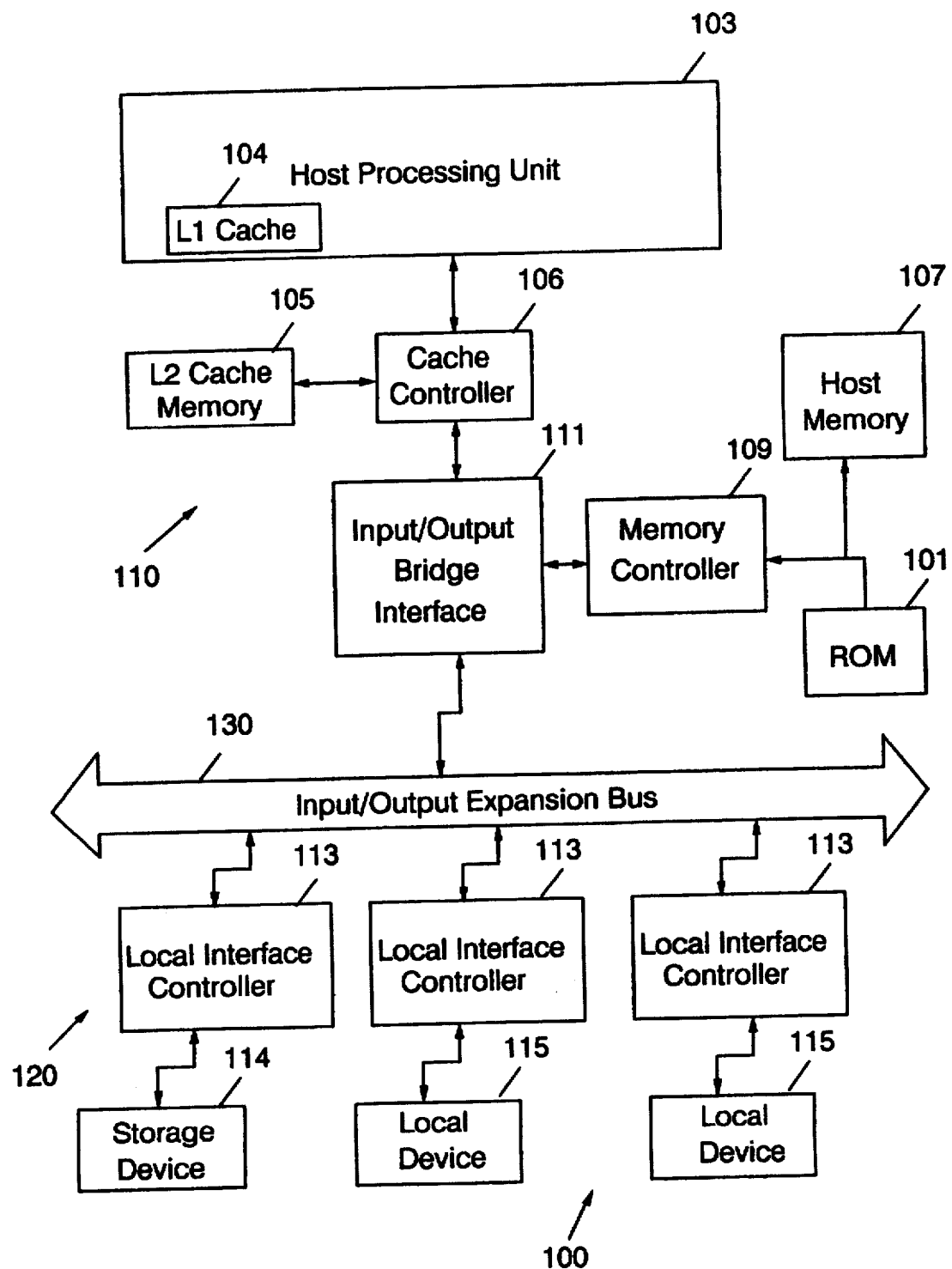
FIG. 1, is a block diagram of an exemplary computer system incorporating the present invention.

Referring to FIG. 1, a block diagram of an exemplary computer system 100 incorporating the present invention is shown. The computer system 100 may comprise a Personal Computer System, such as an IBM Personal Computer or systems compatible therewith. The computer system 100 may operate as a stand alone work station or it may be part of a larger computer network operating either as a client station or a server station.

The computer system 100 comprises two processing sides, a host processing side 110 which performs high level processing functions, such as those specified by operating systems and applications, and a local processing side 120 which performs peripheral functions, such as providing storage media interface or communication interface for the computer system 100. The first and the second processing sides 110 and 120 are coupled to each other via an input/output (I/O) expansion bus 130. The I/O expansion bus 130 is compliant with one of many suitable I/O expansion bus protocols that allow a local interface controller to take control of the bus for performing a specified function, such as transferring blocks of data across the I/O expansion bus 130. Examples of such bus protocols include those defined by PCI or MicroChannel specifications which are hereby incorporated by reference.

The host processing side 110 may include a single host processing unit 103 or, in a multi processing system, a plurality of host processing units for controlling the overall function of the computer system 100. The host processing unit 103 may be one of many commercially available host processing units such as Pentium Processor (R) offered by Intel(R) Corporation, or a PowerPC(R) processor offered by IBM(R) Corporation. As is well known, the host processing unit 103 initially operates by executing firmware instructions stored in a Read-Only-Memory (ROM) ROM 101. The firmware instructions, also known as Basic I/O System or BIOS may include instructions for detecting attached devices and instructions for a power on self test (POST). Generally, upon completion of the firmware instructions, the host processing unit 103 executes operating system instructions by loading the OS from a local side storage device 114 into system memory 107. The transfer of data between the host processing unit 103, the ROM 101 and the system memory 107 is controlled by a memory controller 109. Whereas, transfer of data between the host processing side 110 and the I/O expansion bus 130 is controlled by an I/O bridge interface 111. In order to enhance processor performance the host processing unit 103 may include an internal cache (L1) 104 and/or an external cache (L2) 105 for storing most recently used data and instructions thus minimizing system memory cycles. The cache memory generally comprises a high speed static random access memory (SRAM) which is positioned in close proximity to the host processing unit 103. The data transfers in and out of the L2 cache are controlled by a well known cache controller 106. The I/O bridge interface 111 is designed to interface between the memory controller 109, the host processing unit 103 via the external cache controller 106, and the I/O expansion bus 130. The host processing unit 103 interfaces with the I/O expansion bus 130 and consequently with the local processing side 120 via a suitable I/O bus bridge 111.

As explained later in detail the storage device 114 interfaces with the I/O expansion bus 130 via a local side interface controller 113. One of ordinary skill in the art may appreciate that the depicted host processing side 110 is merely exemplary and depending on application various system architecture may be designed to implement the functional requirement of the host side 110.

On the local side 120, the computer system 100 may include a plurality of local interface controllers 113, such as Small Computer System Interface (SCSI) controllers which are coupled to various peripheral devices 115. As such, storage devices, communication devices, printing devices, networking devices, imaging devices, etc. may be added to complement system functionality and features. For example, the computer system 100 may be utilized as a server station having a Fast Wide SCSI local interface controller with a Redundant Array of Inexpensive Drives (RAID) as storage devices.

Figure 2:
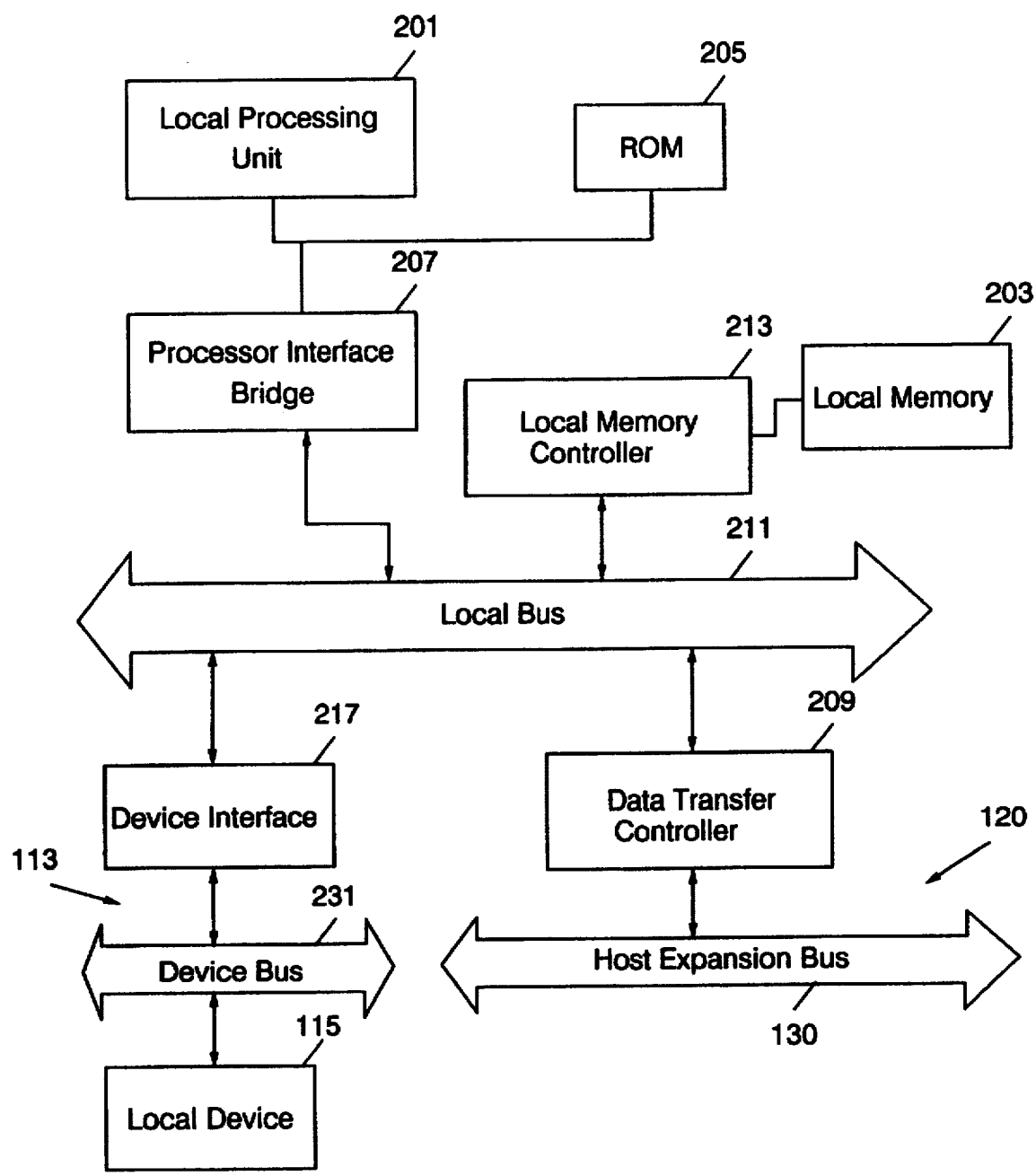
FIG. 2, is a block diagram of local interface controller of FIG. 1.

Referring to FIG. 2, a more detailed block diagram of the local side interface controller 113 is shown to include a local processing unit 201 for controlling the overall peripheral functions of the local side including its ability to act as a bus master for controlling the I/O bus 130. The local processing unit 201 may comprise a variety of commercially available processors such as a PowerPC(R) 403 controller offered by IBM(R) Corporation. Similar to the host side 110, the local processing unit 201 executes firmware instructions stored in a local ROM 205. The local interface controller 113 includes a local bus 211 for interfacing the local processing unit 201 with various local side elements via a local processor interface bridge 207. Preferably, the local bus 211 comprises a PCI bus. Also coupled to the local bus 211 is a local memory controller 213 for controlling transfer of data in and out of the local memory 203. On the other side of the local I/O bus 211, a well known device interface bridge 217 is coupled between the local bus 211 and a device bus 231 (e.g. SCSI bus). The local interface controller 113 interfaces a local device 115, such as a SCSI storage device, through the device interface bridge 217. In the preferred embodiment of the present invention, the device 115 is one of a number of devices which comprises a RAID storage array capable of transferring large blocks of data with the local processing side 120. A data transfer controller bridge 209 interfaces the local I/O bus 211 to the I/O expansion bus 130 as well as controlling scatter/gather transfer of data between the host processing side 110 and the local processing side 120 in accordance with the present invention.

The preferred embodiment of the present invention is capable of transferring blocks of data in two distinct data transfer modes: a single block data transfer mode and a scatter/gather data transfer mode. In the single block transfer mode, only one block of data, as identified by information specifying its location in a memory area, are transferred. In scatter/gather transfer mode, a plurality of data blocks scattered in a memory area and identified by a set of information specifying their location and size, are transferred.

According to the present invention, the host processing unit 103 before the start of any data block transfer, preferably upon initialization, stores a set of information in a status queue register set defining a status queue memory portion. The status queue memory portion, which is preferably located at an address within the host memory 107, includes a plurality of status information images. The status information images store status information relating to a corresponding data block transfer command. The host processing unit upon initialization also sets appropriate pointer values pointing to addresses withing the status queue portion indicating where a subsequent status image is to be stored and where a subsequent status image is to be retrieved from. Preferably, the status register set is located within the local processing side 120 and a status transfer controller is responsive to this register set for transferring status information images to the status queue memory portion on the host processing side 110 without local processing unit intervention. Thus, the local processing unit 201 is relieved of overhead involved with transmitting status information after completion of each data block.

As mentioned before, the system of present invention is capable of operating in a single block transfer mode or dual sided scatter/gather transfer mode. In the single block transfer mode, the status transfer controller transfers the status queue images after completion of each single block data transfer. Whereas, in the scatter/gather transfer mode, the status images are transferred upon completion of all scattered data blocks involved in the scatter/gather operation.

In order to support dual sided scatter/gather transfer mode, the local processing side 120 and the host processing side 110 each maintain active scatter/gather lists which allow them to concurrently perform gathering and scattering operations on both sides. In the preferred embodiment, the local and host scatter/gather lists are respectively stored in local and host memory. During each data block transfer, data gathered on one processing side are concurrently scattered on the other processing side. Scatter/gather operation on each side is performed in accordance with a corresponding scatter/gather list. Thus, the computer system of the present invention stores a first set of information indicating the address of each host memory portion involved in the data transfer. Similarly, a second set of information indicates the address of each local memory portion involved in the data transfer. In the preferred embodiment the first and second set of information includes starting addresses and respective sizes of the host and local memory portions which are located within the local memory 203 and the host memory 107, respectively. It should be noted that during a block transfer involving a scatter/gather operation on both sides, the host and local scatter/gather lists are created such that the total amount of gathered data on one side equals that of scattered data on the other side. Therefore, upon initiation of a large data block transfer, the transmitting processing side, i.e., the host or the local processing side 110 or 120, informs the other side of the size of the data block. In the local side, the local processing unit 201 executing corresponding firmware code creates the local scatter/gather lists to correspond to the size of the data block involved in the transfer. In the host processing side 110, the device driver code of the local interface unit is executed for creating the host scatter/gather list. It should also be noted that, the storage areas for local and host scatter/gather lists is not limited to that described above. The local and host scatter/gather lists may be stored in the same memory area contained in the local memory, the host memory or an independent memory system.

Figure 3A:
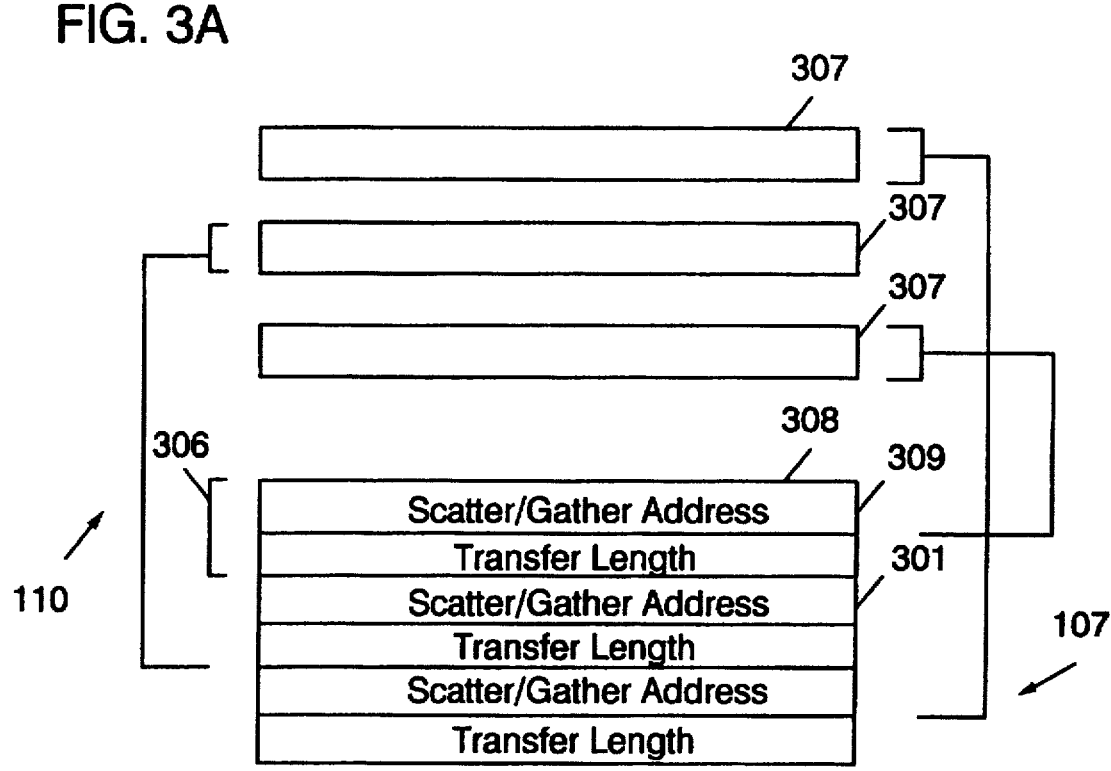
FIG. 3, is a diagram illustrating concurrent scatter-gather operations according to the present invention.
Figure 3B:
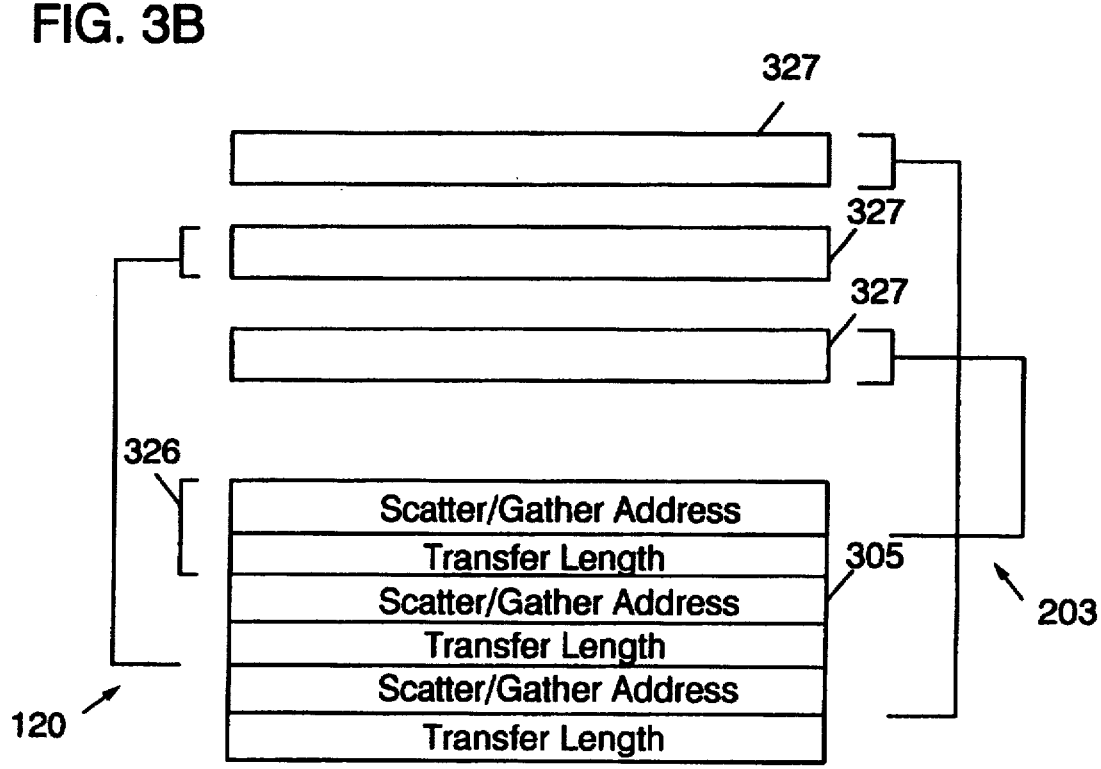

Referring to FIG. 3, a diagram of a scatter/gather operation illustrate concurrent performance of the scatter/gather operations on the local processing side 120 and the host processing side 110. On the host processing side 110, the host memory 107 includes a host scatter/gather list portion 301 and a plurality of data block portions 307 which, as shown, are scattered within the host memory 107 and thus are located at noncontiguous address locations. The host scatter/gather list portion 301 has a predefined number of list elements 306 containing information pointing to a specific data block portion 307. Each scatter/gather list element is divided into two sections: a starting address section 308 and a transfer length section 309. In the preferred embodiment of the present invention, the scatter/gather list portion 301 comprises 8 byte list elements subdivided into two 4 bytes portions. The first four bytes comprise the data block starting address portion 308 indicating the starting address of a data block location and the last 4 bytes comprise the transfer length portion 309 indicating the length of the corresponding data block. As shown by the arrows, each scatter/gather elements 306 corresponds to a particular data block by defining its starting address and its byte count. Similarly on the local side the local memory 203 includes a local scatter/gather list portion 305 and noncontiguous data block portions 327, wherein scatter/gather elements 326 point to corresponding data blocks 327. It may be appreciated that the information pointing to data block may comprise a variety of information specifying location of a corresponding data block in the memory, such as starting and ending address of the data block.

As mentioned before, in the preferred embodiment, the scatter/gather list corresponding to each side is stored in memory portions of corresponding host memory 107 and local memory 203. In the host processing side 110, the host scatter/gather list is generated by the device driver of the local interface controller 113. Whereas, the local scatter/gather list is generated by the firmware stored in the ROM 205. In either processing side 110 or 120, during a scatter/gather operation, a block of contiguous data is broken into a plurality of smaller data blocks which are scattered according to a corresponding scatter/gather list. Similarly, during a gather operation the scattered data blocks are gathered according to an active scatter/gather list on a corresponding side. Thereafter, the gathered data blocks are consolidated to form a contiguous data block for further processing. It should be noted that a large data transfer may involve a plurality of scatter/gather lists each defining a particular smaller scatter/gather transfers of data blocks. Also the scatter/gather lists for the local and host processing sides are created such that the total size of the data blocks on each side is equal to each other.

Figure 4A:
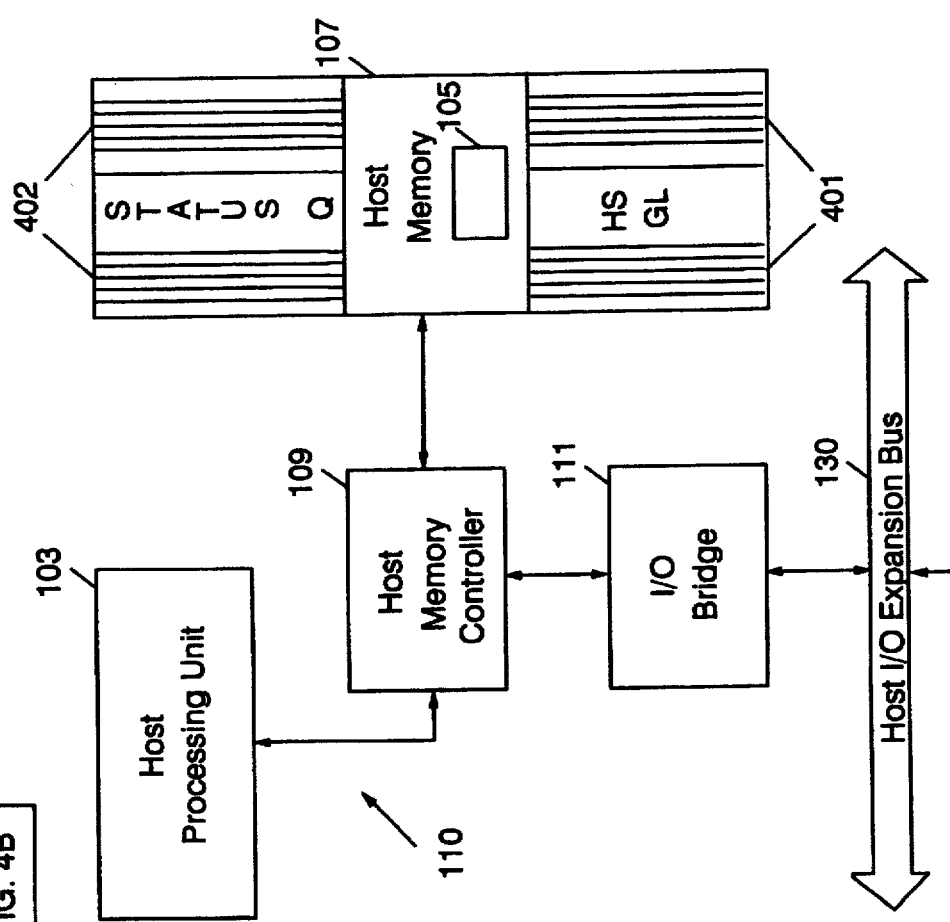
FIG. 4, is a more detailed block diagram of the computer system of FIG. 1.
Figure 4B:
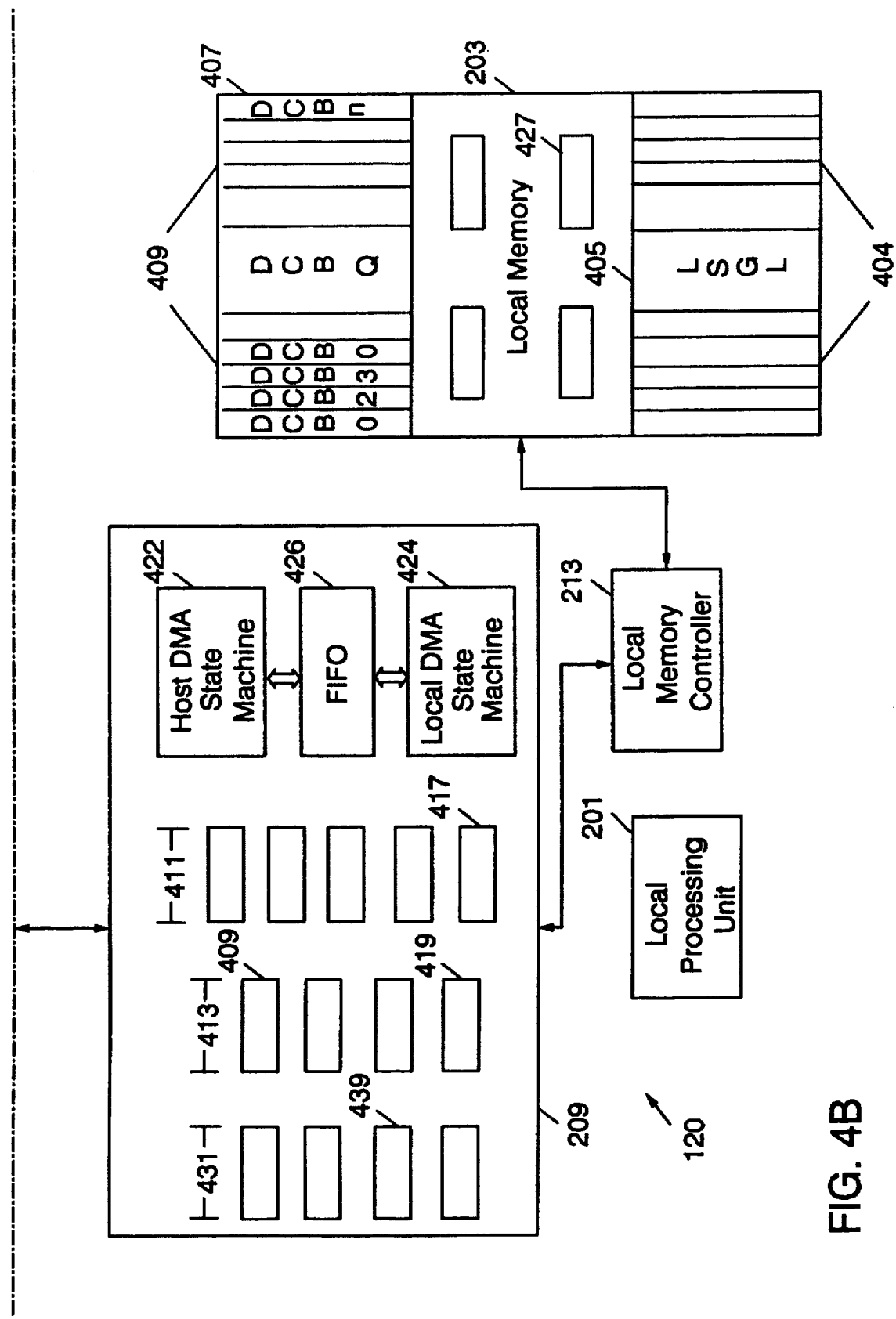

Referring to FIG. 4, a more detailed block diagram of relevant portions of the host processing side 110 and the local processing side 120 which implement the preferred embodiment of the present invention is shown. On the local processing side 120, the data transfer controller 209 includes a host DMA state machine 422 for transferring data blocks in and out of the host memory 107 over the I/O expansion bus 130. The data transfer controller 209 also includes a local DMA state machine 424 for transferring data blocks in and out of the local memory 203 via the local memory controller 213. A first-in-first-out (FIFO) buffer 426 coupled between the DMA state machines 422 and 424 is disposed within the data transfer controller 209 for temporality storing data blocks involved in the data transfer. During a data transfer from the host processing side 110 to the local processing side 120, the FIFO buffer 426 receives and temporarily stores gathered host data from the host DMA state machine 422 and provides such temporarily stored data to the local DMA state machine 424 to be scattered. Conversely, during a data transfer from the local processing side 120 to the host processing side 110, the FIFO buffer 426 received and temporarily stores gathered local data from the local DMA state machine 424 and provides such temporarily stored data to the host DMA state machine 422 for being scattered on the host processing side 110.

When transferring large blocks of data, such as those stored in RAID storage devices, it is advantageous to initiate a single data transfer command covering a group of smaller data blocks. That is, the data transfer throughput is greatly increased if host processing unit initiates a single data transfer commands for a group of data blocks as opposed to initiating a plurality of data transfer commands for each of such data blocks. For example, similar to DMA commands for transferring data blocks, it is advantageous to initiate a single command by specifying starting address and byte count of the data block. Alternatively, if a large data block needs to be scattered into 4 smaller memory portions it is desirable to perform such data transfer using a single data transfer command instead of initiating four separate data transfer commands for each block to be scattered. Accordingly, the present invention utilizes data channels which allow multiple scatter/gather list elements (e.g elements 306 and 307 of FIG. 3) to be grouped together and transferred during a single transfer command operation. In the preferred embodiment, the data channels comprise one or more data channel control block (DCB) images stored in local memory 203. Accordingly, the data transfer controller 209 has a DCB register set 411 comprising five 32 bit registers 417. As described below each DCB image has a predefined structure defining starting address of a scafter/gather list and a count of subsequent scatter/gather elements to be processed.

The present invention takes advantage of the assumption that most of the data blocks involved in a data transfer are not likely to encounter an error conditions. Therefore, the local memory includes a DCB memory portion comprising a plurality of DCB images. The DCB images store a default status information indicating no error condition. A data transfer status detector determines whether the default no error condition is true or not. If true, the default status information is transferred to a corresponding status image without local processing unit intervention. However, if an error condition is detected the local processing unit becomes involved with transferring the error status information by handling appropriately generated error interrupts.

Figure 5:
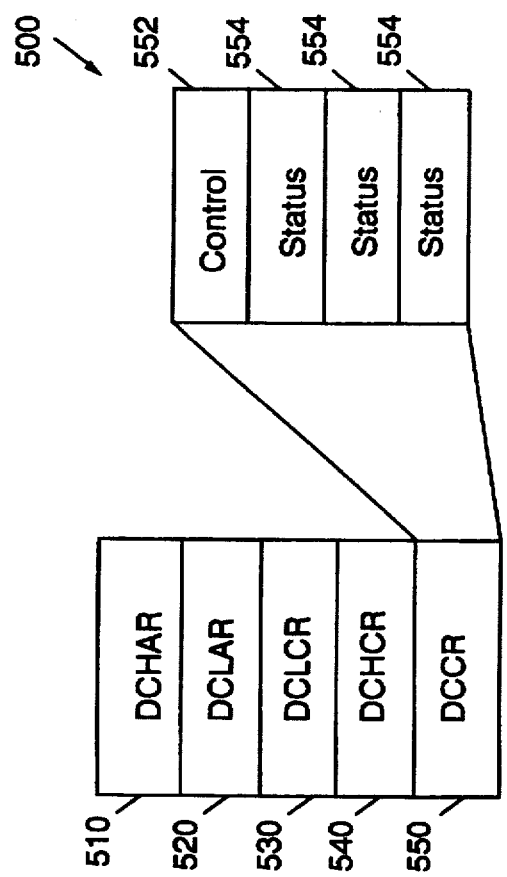
FIG. 5 is a diagram of a DCB register set shown in the block diagram of FIG. 4.

Referring to FIG. 5, a diagram 500 defining the DCB register set 411 according to the preferred embodiment of the present invention is shown. The DCB register set 411 comprises five 32 bit registers. Depending on the data transfer mode, i.e., single block transfer mode or scatter/gather transfer mode, the content of the 32-bit registers specify addresses of a single data block or the address of the scatter/gather list portion. In a single block transfer mode, a 32 bit Data Channel host Address Register (DCHAR) 510 contains a starting host memory address of a contiguous block of data. However, in scafter/gather transfer mode, the DCHAR 510 contains the starting host memory address of a scatter/gather list stored in the host or memory 207. Similarly, in the single block transfer mode, a 32 bit Data Channel Local Address Register (DCLAR) 520 contains a starting local memory address of a contiguous block of data. Whereas, in the scatter/gather transfer mode, DCLAR 520 contains the starting local memory address of a scatter/gather list stored in the local memory 203. Depending on the transfer mode, a 32 bit Data Channel local Count Register (DCLCR) 530 contains either the data block count value or the count value of the local scatter/gather list. Similarly, a 32 bit Data Channel host Count Register (DCHCR) 540 contains either the data block count value or the count value of the host scatter/gather list. A 32 bit Data Channel Control Register (DCCR) 550 contains a single byte of control information 552 and 3 bytes of status fields 554 for indicating the non-error completion status of a DCB operation. As described later in detail, the status fields 554 store a default data transfer condition indicative of existence of no error which is automatically transferred to the status queue portion in host memory unless a data transfer error condition is detected.

Figure 6:
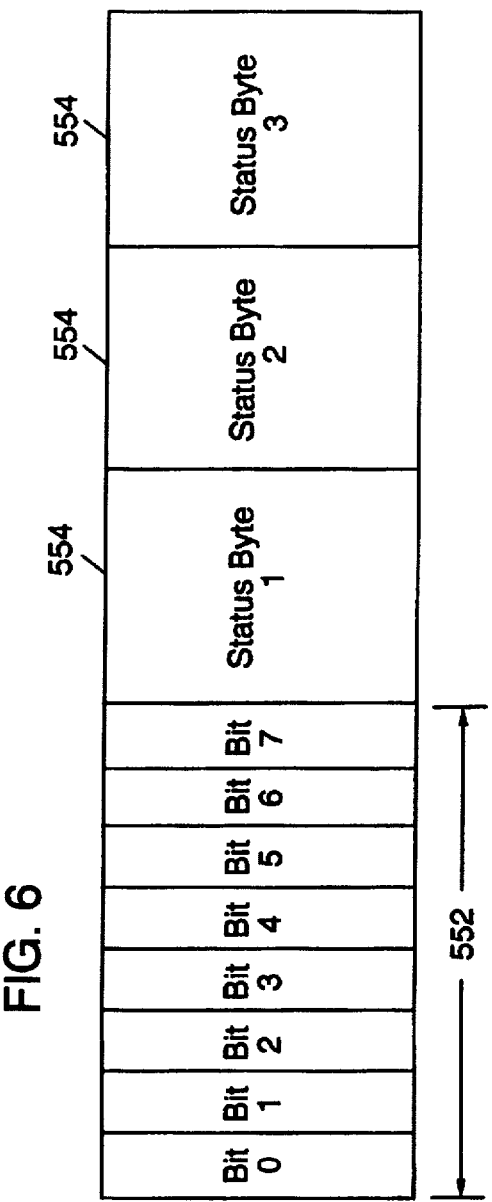
FIG. 6 is a diagram of a DCCR register shown in FIG. 5.

Referring to FIG. 6, a diagram of the DCCR 550 is shown. The control register 552 comprises eight bits defined below:
Bit 0, reserved,
Bit 1, when set to 1, starts the data channel operation for the current data block transfer.
Bit 2, when set to 1, indicates a data transfer direction from host processing side to local processing side. When set to 0 the data transfer direction is from the local processing side to host processing side.
Bit 3, Reserved.
Bit 4, when set to 1, will cause the data channel interrupt to be set upon completion of the current data block transfer.
Bit 5, the auto-status-enable bit (ASE), when set to 1 with DCCR bit 2 set to 0, will initiate an automatic transfer of the DCCR status bytes onto the status queue in the host memory upon completion of the current data transfer.
Bit 6, when set to 1, enables scatter/gather processing from local memory.
Bit 7, when set to 1, enables scatter/gather processing from the host memory.

It should be noted that the preferred embodiment of the invention allows the scatter/gather transfer to be enabled on one or both sides. In order to enable dual sided scatter/gather mode, both bits 6 and 7 must be set. As herein described, a scatter/gather transfer mode is enabled if both bits 6 and 7 are set.

The status bytes 1, 2, and 3 contain 3 bytes of status block. Depending on the function provided by the local interface controller these bytes may be defined to indicate various status conditions.

Figure 7:
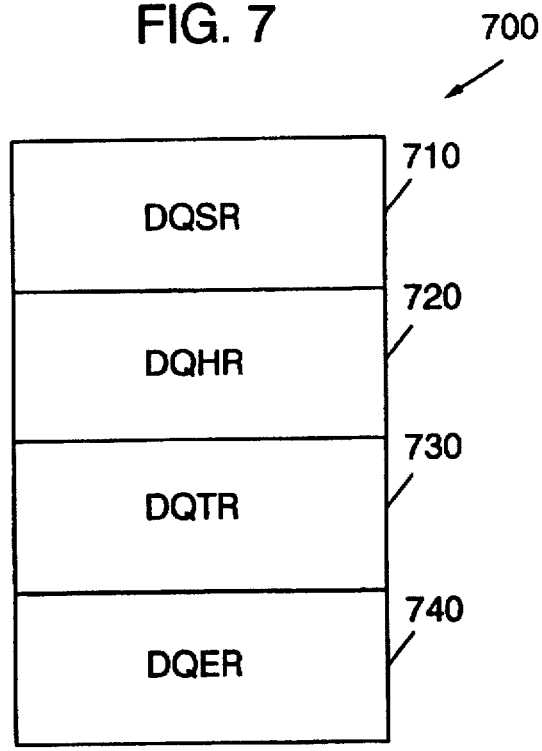
FIG. 7 is a diagram of a DCB queue register set shown in the block diagram of FIG. 4.

The present invention further contemplates providing for queuing of multiple DCBs to allow a sequence of DCBs to be processed with minimized local processing unit overhead. Thus, the data transfer controller 209 includes a DCB queue register set 413 and a status queue register set 431 comprising four 32-bit registers 419, and 439. Referring to FIG. 7, a diagram 700 defining the DCB queue register set 413 is shown. A DCB Queue Start Register (DQSR) 710 contains a DCB start pointer which is the local memory address of the start of a DCB queue memory portion. A DCB Queue Head Register (DQHR) 720 contains a DCB queue head pointer which is the local memory address where the local processing unit 201 will store the next DCB image. A DCB Queue Tail Register (DQTR) 730 contains a DCB tail pointer which is the local memory address where the data transfer controller 209 will fetch the next DCB image. A DCB Queue End Register (DQER) 740 contains a DCB end pointer which is the local memory address of the end of the DCB queue memory portion.

Figure 8:
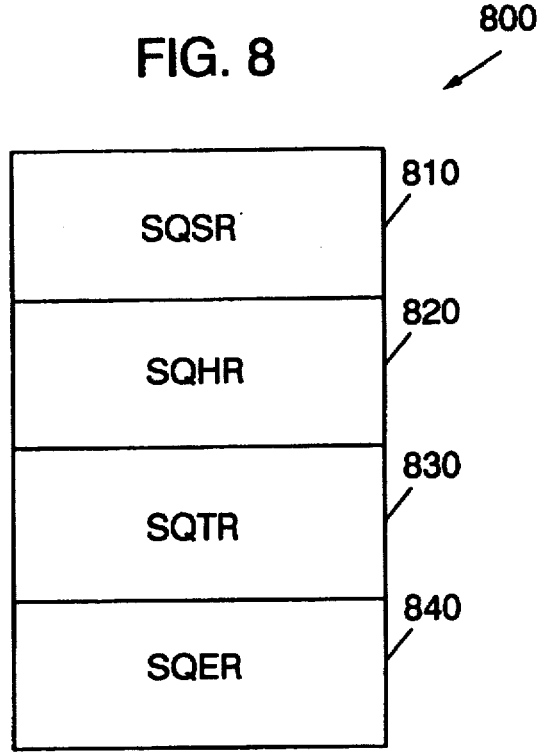
FIG. 8 is a diagram of a status queue register set shown in the block diagram of FIG. 4.

Referring to FIG. 8, a diagram 800 defining the status queue register set 431 is shown. A Status Queue Start Register (SQSR) 810 contains a status queue start pointer pointing to a system memory address indicating the start of a status queue memory portion. A Status Queue Head Register (SQHR) 820 contains a status queue head pointer pointing to a host memory address indicating a host memory address where the data transfer controller 209 will next store a status queue image. A Status Queue Tail Register (SQTR) 830 contains a status tail pointer pointing to a host memory address indicating where the host processing unit 103 will next fetch or retrieve a status queue image. A Status Queue End Register (SQER) 840 contains a status queue end pointer pointing to a host memory address indicating the end of the status queue memory portion.

Referring back to FIG. 4, the five registers 417 of the register set 411 respectively correspond to the five 32 bit registers, DCHAR 610, DCLAR 620, DCLCR 630, DCHCR 640, and DCCR 650 of the DCB 500 illustrated in FIG. 5. Similarly, the registers 419 of the DCB Queue register set 413 correspond to the registers DQSR 710, DQHR 720, DQTR 730 and DQER 740 of FIG. 7, and the registers 439 of the Status Queue register set 431 correspond to the registers SQSR 810, SQHR 820, SQTR 830 and SQER 840 of FIG. 8. In the preferred embodiment of the present invention the register sets 411, 413, and 431 are incorporated within the data transfer controller 209.

As shown, the local memory 203 is partitioned into a DCB queue memory portion 407 for storing one or more DCB images 409 and a local scatter/gather list (LSGL) portion 405 corresponding to portion 305 of FIG. 3 for storing a plurality of scatter/gather lists 404. As described above the local DMA state machine 424 controls transfer of local data including those stored in the DCB portion 407 and LSGL portion 405 to the data transfer controller 209. Also shown are a plurality of scattered local memory portions 427 for storing non-contiguous data blocks corresponding to memory portions 327 shown in FIG. 3.

On the host processing side 110, the host memory 107 is partitioned to include status queue memory portion 402 and a host scatter/gather list (HSGL) portion 401 corresponding to portion 305 of FIG. 3. As described before, the host memory controller 109 controls transfers of data among host memory 107 (including status queue portion 402 and the HSGL portion 401), host processor 103 and the I/O bridge 111. Whereas, the host DMA state machine 422 controls transfer of data between the host processing side 110 and the local processing side 120. Also shown are a number of scattered host memory portions 107 for storing scattered data blocks corresponding to memory portions 307 shown in FIG. 3.

Operationally, upon system start up or initialization, the local processing unit 201 loads predefine values into DQSR 710, DQHR 720, and DQTR 730 indicating the starting address of the DCB queue memory portion 407 of the local memory 203 designated for DCBs. Initially, the DQSR 710, DQHR 720 and DQTR 730 are loaded with identical values indicating starting address of the designated DCB queue portion 407 of the local memory 203. Thus, values in DQHR 720 and DQTR 730 indicate the same address pointing to a DCB image where a subsequent DCB image is stored and where a subsequent DCB image is retrieved. The DQER 740 is loaded with a value indicating the ending address of the designated DCB queue portion 407.

Similarly, upon system initialization, the host processing unit 103 writes predefined values into SQSR 810, SQHR 820, and SQTR 830 setting the boundaries of the status queue memory portion 402 as well as storing default values for status head and tail pointers to indicate where a subsequent status queue image is stored and where it is to be retrieved from. The SQER 740 is loaded with a value indicating the ending address of the designated status queue portion 407.

The DCBs are created by the local processing side firmware based on read/write commands issued by the device driver code running on the host processing side. As the DCB images are created DQHR is incremented to the next DCB element address. Consequently, DQHR head pointer is no longer equal to the DQTR tail pointer. While building DCB images 409 the local processing unit appropriately sets corresponding bits in the DCCR word to indicate whether the created DCB image is part of a scatter/gather transfer mode or a single block transfer mode. Also, bit 2 of the DCCR word is appropriately set to indicate the direction of the data transfer. That is, whether the data transfer is from the host processing side 110 to the local processing side 120 or vice versa.

Once a DCB image has been assembled in local memory by the local processing unit 201 and the DQHR has been incremented to be unequal to DQTR, the local DMA state machine 424 will read the DCB image, starting at the address in DQTR, and load it into the DCB register set 411. The local DMA state machine 424 will then increment the DQTR by the length of the DCB image. Once a DCB is loaded into the DCB register set, the data transfer controller 209 determines the transfer mode by decoding the scatter/gather enable bit of the DCCR control register 552. In a single block transfer mode, the value in the DCHAR and DCHCR are interpreted as the starting address of a host memory block and corresponding byte count thereof. Similarly, DCLAR and DCLCR are interpreted as the starting address of a local memory block and corresponding byte count thereof. In a scatter/gather mode, however, the DCHAR and DCHCR are interpreted as pointers to separate scatter/gather lists in corresponding portions 401 & 404 of host or local memory 107 & 203. The DCLAR and DCLCR are respectively interpreted as pointing to the start of a scatter/gather list and a corresponding list count in the LSGL portion 404 of the local memory. Similarly, list DCHAR and DCHCR are interpreted as pointing to a host scatter/gather list and corresponding count in the HSGL portion 401 of the host memory 107.

Thereafter, the local DMA state machine 424 proceeds to fetch and decode the LSGLs starting with the address indicated by DCLAR and ending with the element count specified by DCLCR to determine for each scatter/gather list element the starting address of the associated data blocks and its byte count in the local memory. Similarly, HSGL elements are fetched and decoded by the host DMA state machine 422 starting at the address indicated by the DCHAR with element count specified by DCHCR.

Depending on the direction bit of the DCCR for each DCB, data is gathered from corresponding local memory portions in the local processing side 120 and is scattered to the corresponding memory portions in the host memory in the host processing side. Alternatively, the data may be gathered from indicated host memory portions in the host processing side 110 and scattered into corresponding local memory portions in the local processing side 120.

The above described scatter/gather operation is performed by the host DMA state machine 422 and local DMA state machine 424. The data involved in the data transfer is temporarily stored in the FIFO buffer 426 in a first in first out basis. That is, during a data transfer from the local processing side 120 to the host processing side 110, the local DMA state machine 424 retrieves blocks of data as defined by the scatter/gather list elements and provides them to the FIFO buffer 426. The FIFO buffer 426 receives the data block, from the local DMA state machine 424 and temporarily stores such data to be fetched by the host DMA state machine 422. Concurrently, therewith, the host DMA controller 422 fetches data blocks from the FIFO buffer 426 for transmission to the host processing side 110. Similarly, when transferring data from the host processing side 110 to the local processing side 120, the FIFO buffer 426 receives data from the host DMA state machine 422 and provides it to the local DMA state machine 424. The data on both the local processing side 120 and the host processing side 110, is gathered and scattered from appropriate memory portions as indicated by corresponding host and local side scatter/gather list elements. As mentioned before, the local and host scatter/gather lists are created to allow collective data blocks involved in the scatter/gather operation on each side to equal the total amount of data involved in the data transfer.

The data transfer controller 209 performs the above specified steps for each DCB image 409 queued in the DCB portion 407 of the local memory. Upon processing each DCB image, the data transfer controller 209 increments the tail pointer in the DQTR. Upon completion of each DCB, the data transfer controller 209 compares the head pointer value stored in the DQHR to the tail pointer value stored in the DQTR. The DCB dequeuing operation is continuously performed for as long as the head pointer value is not equal to the tail pointer value. However, when the head pointer value becomes equal to tail pointer value, the data transfer controller 209 will terminate DCB data transfer since such condition indicates completion of all queued DCB images 409. Since the present invention contemplates queuing a number of DCB images 409 greater than the length of the DCB queue(as indicated by the end pointer value stored in the DQER), a wrap around feature is provided. When the number of enqueued DCB images 409 cause DQHR head pointer value to exceed DQER end pointer value, the head pointer is wrapped to have a value equal to the start pointer and upon enqueuing of additional DCB images 409 is incremented. However, in this situation, the local processing unit would enqueue additional DCB images 409 as long as the wrapped DQHR head pointer does not exceed DQTR tail pointer. In order to prevent loss of data during a data transfer, once the wrapped DQHR head pointer is equal to DQTR tail pointer minus a DCB image size, the local processing unit 201 terminates enqueuing additional DCB image 409 until the DCB images addressed by DQTR tail pointer is dequeued.

As the present invention contemplates transferring status information relating to a particular data block transfer with minimum local processing unit intervention, therefore upon completion of a data transfer, bit 5 of the DCCR is examined to determine whether automatic status transfer capability is enabled. If enabled, the data transfer controller 209 initiates an automatic transfer of the DCCR status bytes into the status queue memory portion 402 upon completion of the current data transfer. During a data block transfer, the data transfer controller 209 determines whether an error condition, such as a parity error, has occurred or not by detecting the error condition. Since the error checking operation may be performed within the DMA state machines 422 and 424, thus, the status transfer controller may be disposed in the DMA state machines 422 and 424. If no error conditions are indicated, i.e., the default condition for the status image information is true, then the host DMA state machine 422 transfers status information contained in the corresponding status bytes 554 into a status queue image 402 indicated by the head pointer value in SQHR. Upon transfer of a status information to the host processing side, a hardware interrupt signal is asserted over the I/O expansion bus 130 by the host DMA state machine 422 signaling the host processing unit 103 of existence of an unserviced status image 402. The status queue images 402 are enqueued as more data block transfers are completed. When signaled of existence of an unserviced status queue image 402, the host processing unit 103 is prompted to service a status queue image as indicated by the tail pointer value in SQTR. The head pointer value stored in SQHR is incremented for each status queue image 402 queued in the status queue memory portion 401. Conversely, the tail pointer value stored in SQTR is incremented for each status queue images 402 serviced by the host processing unit 103. Upon servicing each status image 402, the host processing unit 103 increments the tail pointer in the SQTR. For each status image processed, the host processing unit 103 compares the head pointer value stored in the SQHR to the tail pointer value stored in the SQTR. The status image dequeuing operations are continuously performed for as long as the head pointer values in SQHR is not equal to the tail pointer values in SQTR plus the size of status image. However, when SQHR value is greater that SQTR value by the size of the status image, the host processing unit 103 would terminate servicing status queues since such condition indicates completion of all pending status queue images 402. Since the present invention contemplates queuing a number of status queue images 402 greater than the length of the status queue(as indicated by the end pointer value stored in the SQER), a wrap around feature is provided to accommodate situations when the number of enqueued status queue images 402 cause the head pointer value in SQHR to exceed that of SQER end pointer value. In such a case, the head pointer is wrapped to have a value qual to the start pointer and upon enqueuing of additional status queue images 402 is incremented. However, in this situation, additional status queue images 402 are enqueued as long as the wrapped DQHR head pointer does not equal SQTR tail pointer. In order to prevent loss of status queue images during a data transfer, once the wrapped SQHR head pointer is equal to the SQTR tail pointer minus the size of a status queue image, the enqueuing of additional status queue images 402 is terminated until status queue images addressed by SQTR tail pointer are dequeued.

In order to avoid race conditions that may occur between the host processing unit and the local processing unit doing simultaneous queuing and dequeuing of the status queue images, when the data transfer controller 209 has enqueued status, it signals this event by setting an interrupt. Host status dequeue code then reads the status queue head pointer value in the SQHR. Preferably, the host status dequeue code keeps a software version of the status queue tail pointer to minimize the number of host bus operations while servicing the status queue. This code can then increment its software copy of the status queue tail pointer and dequeue a status image. If the software copy of the status queue tail pointer is not equal to the status queue head pointer minus the size of the status queue image, that means that there are more status images in the queue. This sequence continues until the software copy of the status queue tail pointer is equal to the status queue head pointer minus the size of the status image. Upon satisfaction of this condition, the software status queue tail pointer is copied to the SQTR. When the status queue tail pointer is copied to the SQTR, data transfer controller 209 compares the new value to the status queue head pointer, and if SQTR is equal to SQHR minus size of the status image, the interrupt is reset. Otherwise, existence of at least one status image has been enqueued since the time that SQHR was read and thus the interrupt will not be reset.

As described above, the present invention significantly improves local and host memory utilization and facilitates data transfer from a local processing side to a host processing side and vice versa by providing concurrent scatter/gather operation on both sides and by minimizing local processing unit intervention in data block transfers.

It may be appreciated that because of the symmetry involved in the above described dual sided scatter/gather operation, one processing side, be it host processing side or the local processing side, may be referred to as a first processing side while the other processing side may be referred to as a second processing side. The present invention contemplates use of the first or the processing side interchangeably. Depending on the direction of the data transfer, the recited scattering (or gathering) operation on one side may be performed on the other side using the teachings of the present invention.

What is claimed is:

1. An information handling system for transferring data blocks between a first processing side and a second processing side over an I/O expansion data bus, comprising:

a host processing unit, a first memory accessible by said host processing unit including first memory portions for storing first data blocks involved in data block transfers between the first processing side and the second processing side;

a transfer status queue memory portion including a plurality of status queue images, each status queue image storing a status information relating to a corresponding data block transfer;

a local processing unit;

a second memory accessible by the local processing unit including second memory portions for storing second data blocks involved in data block transfers between the first processing side and the second processing side, a Data Channel Block (DCB) memory portion comprising a plurality of DCB images wherein each of said DCB images stores:

a first address information corresponding to a first memory portion involved in a data block transfer; and a second address information corresponding to a second memory portion involved in the data block transfer;

a status queue register set programmable by said host processing unit before start of any data block transfer for setting a predefined address for the status queue memory portion and for storing a head pointer value pointing to a default status queue image indicating where a subsequent status information is to be stored and a tail pointer pointing to a default status queue image indicating from where a subsequent status information is to be retrieved;

a first memory access controller responsive to said first address information for accessing a corresponding first memory portion;

a second memory access controller responsive to said second address information for accessing the corresponding second memory portion; and a data transfer status controller which stores status queue images for a successful transfer as data is being transferred, includes hardware logic which monitors for errors during data transfer and is responsive to said data transfer queue register set for transferring a corresponding status queue image into the data transfer status queue memory portion upon completion of a data transfer without errors and includes hardware logic which detects the transfer of the status queue image into the status queue memory portion and responsively sends an interrupt to the host processor to indicate an unserviced status image, whereby status information is provided to the host processing unit without local processing unit intervention.

2. The information handling system of claim 1, wherein said first processing side comprises a host system, and wherein said second processing side comprises a local interface controller.

3. The information handling system of claim 1, wherein said DCB memory portion is part of the second memory.

4. The information handling system of claim 1, wherein said status queue memory portion is within the first memory.

5. The information handling system of claim 1, wherein the data transfer status controller monitors the head and tail pointer values stored at the transfer queue register set to detect the completion of a data transfer.

6. The information handling system of claim 5, wherein the first memory portions store blocks of scattered data, wherein said blocks of scattered data collectively represent the data block to be transferred between the first processing side and the second processing side; and wherein a first scatter/gather list memory portion includes a plurality of first list elements, wherein each of said first list elements stores a first set of information indicating addresses for each of the first memory portions;

wherein said first memory accesses controller is responsive to said first scatter/gather list for gathering said scattered data from said first number of memory portions.

7. The information handling system of claim 6, wherein said first set of information includes starting address and respective sizes of the first memory portions.

8. The information handling system of claim 6, wherein said first scattergather list memory portion is a part of the first memory.

9. The information handling system of claim 6, wherein said second number of memory portions store said gathered data from said first processing side; and wherein a second scatter/gather list memory portion includes a plurality of second list elements, wherein each second element stores a second set of information indicating addresses for each of the second memory portions; and wherein the second memory access controller is responsive to said second scatter/gather memory edition list for scattering said gathered data from said first processing side among said second number of memory portions.

10. The information handling system of claim 9, wherein said second set of information includes starting address and respective sizes of the second memory portions.

11. The information handling system of claim 9, wherein the collective amount of gathered data on the first processing side is equal to the collective amount of scattered data on the second processing side.

12. The information handling system of claim 9, wherein said second scattergather list memory portion is a part of the second memory.

13. The information handling of claim 9, wherein said first memory access controller gathers said scattered data from said first memory concurrently with said second memory controller scattering said data into said second memory.

14. The information handling system of claim 13 further including a FIFO register coupled between the host memory access controller and the local memory access controller for receiving and temporarily storing data involved in a data block transfer between the local processing side and the host processing side on a first in first out basis.

* * * * *